Jan. 25, 1955

A. F. ANJESKEY ET AL 2,700,705

ELECTRICAL DUCT AND TROLLEY COLLECTOR

Filed Sept. 27, 1949

INVENTORS
ALPHONSE F. ANJESKEY
BY HARRY A. COTESWORTH
Williams, Hudson, Boughton, David & Hoffmann
ATTORNEYS

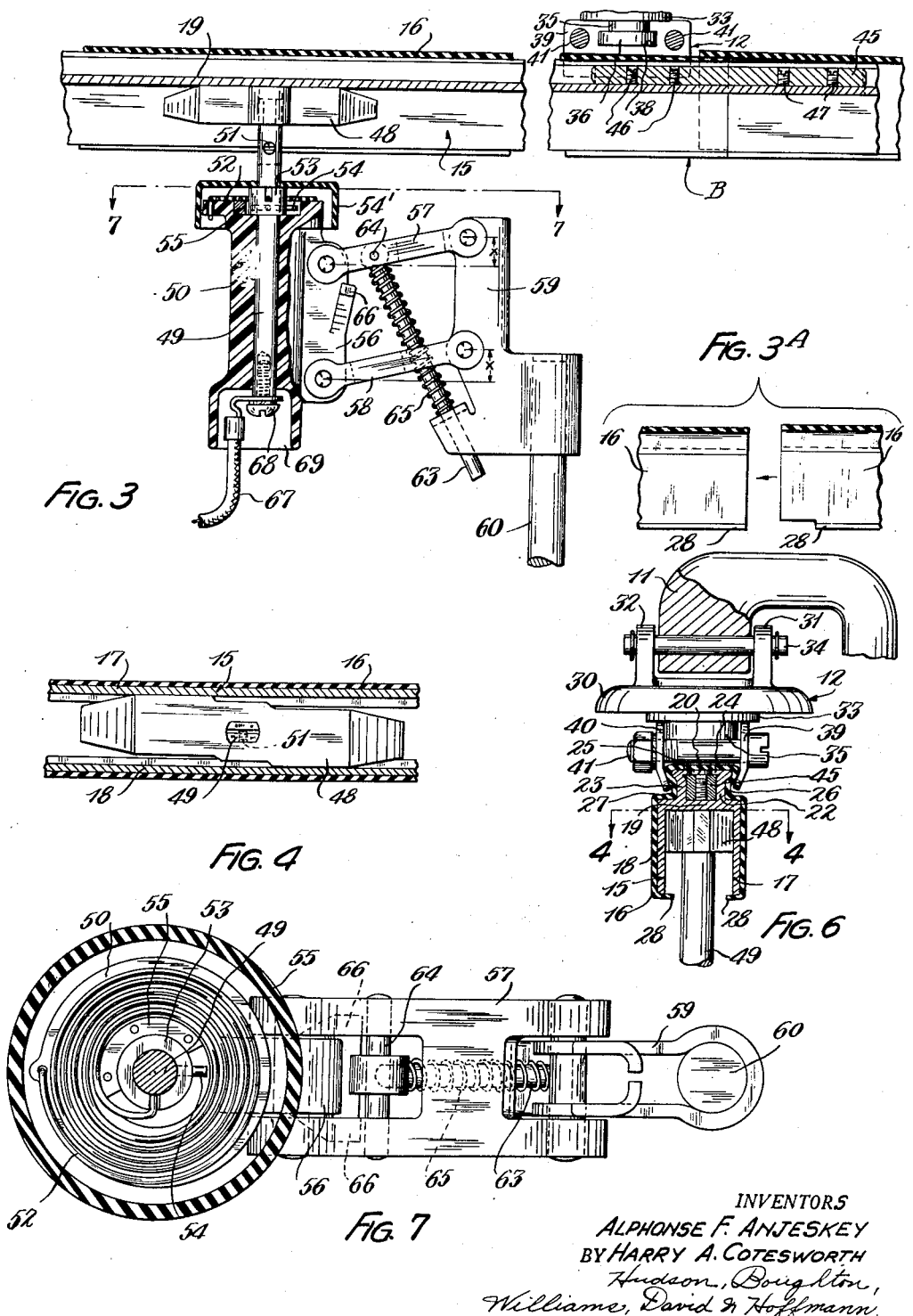

United States Patent Office 2,700,705
Patented Jan. 25, 1955

2,700,705

ELECTRICAL DUCT AND TROLLEY COLLECTOR

Alphonse F. Anjeskey and Harry A. Cotesworth, Cleveland, Ohio, assignors to The Cleveland Crane & Engineering Company, Wickliffe, Ohio, a corporation of Ohio Application September 27, 1949, Serial No. 118,102

18 Claims. (Cl. 191—23)

The present invention relates to an electric distribution system and, more particularly, to an electric distribution system for an electrified material handling apparatus.

One of the principal objects of the present invention is the provision of a new and improved electrical distribution system for an electrified material handling system or apparatus including a movable trolley or carrier, which distribution system comprises an electric conductor having a contact surface or surfaces in the form of a U-shaped channel and a contact shoe or current collector slidably engaged within the channel of the conductor and operatively connected to the movable trolley or carrier in such a manner that it is resiliently urged into electrical contact with the inner or bottom wall of the channel or the opposed side walls of the channel. Preferably the current collector shoe resiliently engages all three walls of the channel.

Another principal object of the invention is the provision of a novel rigid rod-like conductor bar for an electric distribution system of the character referred to, which bar is substantially uniform in transverse cross-section, has a U-shaped contact groove in one side adapted to be slidably engaged by a contact shoe on a trolley or carrier and a longitudinally extending tube-like formation of non-circular transverse cross-section along another side, which tube-like formation provides a socket for receiving a connector member for both mechanically and electrically connecting one conductor bar in end-to-end relation with a like conductor bar.

Another object of the invention is the provision of a novel electric distribution conductor for overhead material handling systems which is easily fabricated and installed and which is insulated in such a manner as to preclude contact therewith by persons through inadvertence.

Another object of the invention is the provision of a novel and improved current collector assembly for a trolley type electric distribution system, which current collector comprises a current collector contact member or shoe adapted to engage within a U-shaped channel in a current conductor and means for resiliently urging the current collector into engagement with the sides of the channel.

The invention resides in certain constructions and combinations and arrangements of parts and further objects and advantages will be apparent to those skilled in the art to which it relates from the following description of the preferred embodiment described with reference to the accompanying drawings forming a part of this specification in which:

Fig. 3 is a view similar to that of Fig. 2 but showing certain parts in section;

Fig. 3A is a fragmentary sectional view of adjacent ends of two insulated conductors about to be connected;

Fig. 4 is a sectional view taken on line 4—4 of Fig. 6;

Fig. 6 is a sectional view taken on line 6—6 of Fig. 2; and

Fig. 7 is a view taken substantially on line 7—7 of Fig. 3.

Figure 1:
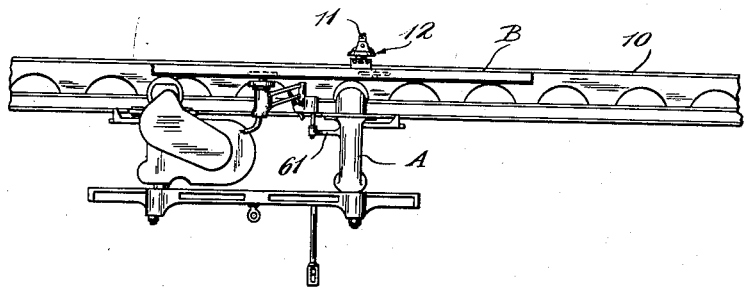
Fig. 1 is a fragmentary, side elevational view of an electrified overhead carrier system embodying the present invention.
Figure 2:
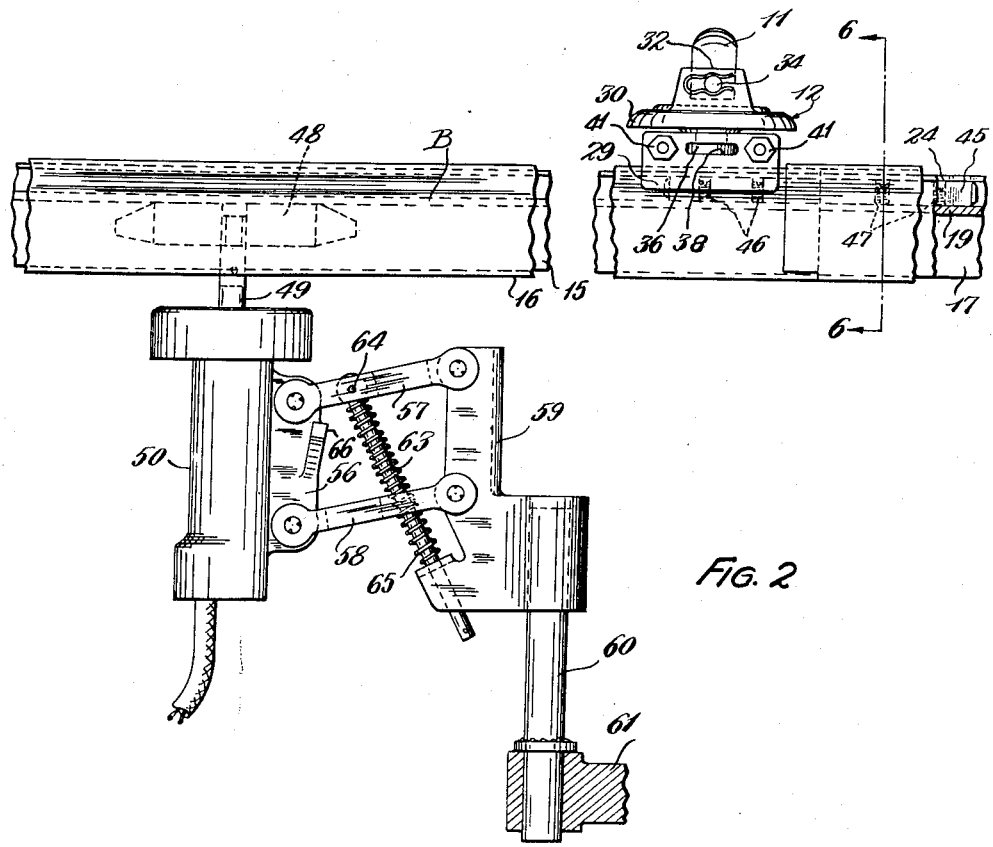
Fig. 2 is a view similar to Fig. 1 but on a larger scale, and certain parts shown in Fig. 1 being omitted.
Figure 5:
Fig. 5 is a side view of a connector rod having a portion thereof broken away.

The invention relates in general to an improved, electrified material handling system wherein an electrically driven trolley or carrier rides on a rail or rails supported in some suitable manner. The power for the trolley or carrier is supplied though one or more conductors which are coextensive with the rail or rails and which are individually engaged by contact shoes carried by the trolley or carrier. In general, the present invention comprises a conductor having a channel formation therealong for receiving a relatively elongated contact shoe, which shoe is supported in such a manner that it is resiliently pressed against the inner wall of the channel and is also resiliently urged about a central axis which is normal to the channel and to the shoe whereby the opposite end portions of the shoe engage opposite side walls, respectively, of the channel. The conductor bars are formed so that they may be severed at any point and a severed end readily connected with another section of a like conductor bar in end-to-end relation. For this purpose, a tube-like formation is formed along the bar, preferably on the side opposite the channel formation, so that a common connector member or rod may be received in the tubular formation of two abutting aligned ends of like conductor bars. The surfaces of the conductor bar, excepting the contact surfaces, are preferably encased in a suitable insulating shield to prevent persons accidentally coming into contact therewith.

Although the invention is susceptible of embodiment in various alternative constructions, it is herein shown and described as embodied in an electrified, overhead carrier system of the monorail type. Referring to the drawings, an overhead carrier indicated generally at A is shown supported on and adapted to travel along a monorail 10 supported from the ceiling of a building or by any other suitable structure. The power for operating the motor of the carrier is collected from two trolley conductors B, only one of which is shown, located on opposite sides of the monorail 10 and supported by the latter through the medium of brackets 11, connected to the rail in any convenient manner and to which brackets the conductors B are connected by hangers 12, see Fig. 6. The brackets 11 are spaced at convenient intervals along the monorail and since only a fragment of the system is shown, only one appears in the drawings.

Each of the conductors B is made up of a number of like sections mechanically and electrically connected in abutting, end-to-end relation, and each of the sections comprises a metal bar 15 which is enclosed within a generally U-shaped insulator sheath 16, preferably composed of a relatively hard, resilient dielectric material. One such material which is particularly suitable is that known commercially as Tenite 2 No. 239 M and manufactured by Tennessee Eastman Corporation of Kingsport, Tennessee. The preferred material is a cellulose acetate butyrate plastic which at 77° F. has a specific gravity of 1.19, a Rockwell hardness of R97, a tensile strength at fracture of 4100 p. s. i. and a module of elasticity of 1.25 p. s. i.$\times 10^5$. This material may be readily extruded in the form of the sheathing shown at a relatively low cost and has such strength and dielectric properties that the sheathing 16 may be made as thin as approximately $\frac{1}{32}''$. The resiliency of the sheathing material enables the sides of the sheathing to be temporarily deflected for placing the sheathing over the conductor bars and to embrace the bars when the sheathing is in place. The sheathing may be made to more securely or tightly engage the conductor bars, other things remaining the same, by manufacturing it so that its sides normally converge slightly towards their free edges.

The conductor bars 15, which are preferably aluminum, each has an inverted, channel-shaped formation on the lower side which extends longitudinally thereof and comprises two opposed side walls 17, 18 interconnected by an inner wall 19. The walls 17, 18 extend in parallel planes and at substantially 90° to the wall 19 and all of the walls serve as contact surfaces for the collector shoe. The bar also has a longitudinally extending, non-circular aperture in the upper side thereof which is formed by two opposed side walls 22, 23 extending upwardly from the wall 19 and which walls have their upper edge portions turned inwardly as at 24, 25, respectively, to form overhanging walls, the end edges of which are spaced throughout the length of the conductor bar and provide a slot-like opening 20. The width of the tubular formation is preferably somewhat less than the channel formation and the upper portions of the walls 22, 23 are provided with outward projections or beads which form ribs which interlock with the sheathing 16 and also assist in securing the conductor bar to the hangers 12. Preferably the tube-like formation is non-circular in cross-sectional shape and, in the present embodiment, it is shown to be substantially rectangular, except for the opening along the top thereof.

The insulating sheath 16 generally conforms to the external form of the conductor bar 15 and encloses the top and sides of the bar. The lower edges of the sheathing preferably have inturned flanges 28 which conceal the lower edges of the channel walls 17, 18. The upper portion of the sheath has longntudinally extending grooves 26, 27, which receive clamp plates of the hangers 12. As mentioned hereinbefore, the sheath 16 may be formed by an extrusion process and it may be applied over the conductor bars by spreading the resilient sides to receive the conductor bars in the open side.

The hangers 12 each comprises a disk shape dielectric member 30 having two lugs 31, 32 projecting from the top surface and a circular boss 33 projecting from the lower surface. The lugs 31, 32 have aligned openings and are attached to the outer ends of the brackets 11 by pins 34 extending through the openings in the lugs and openings in the ends of the brackets 11, as seen in Fig. 6. The boss 33 has a reduced diameter at 35 and a flat head formation 36 at the lower end of the boss extends into slots 37, 38 formed in clamp plates 39, 40 on opposite sides of the head and clamped together by nuts and bolts 41. The lower edges of plates 39, 40 are bowed inwardly and grip the sheathed conductor bars at 26, 27, as seen in Fig. 6. It will be apparent that this construction enables the plates 39, 40 to be set at any desired angle relative to the axis of the member 30 which is advantageous in the installation of the conductor bars.

Two conductor bars 15 are adapted to be connected together in abutting, end-to-end relationship mechanically and electrically by a connector member 45. The cross section of the connector member substantially corresponds to the cross section of the interior of the tube-like formation in the upper side of the conductor bars, and opposite ends of the connector are provided with two sets of clamp screws 46, 47 threaded in openings therethrough. In connecting two aligned conductor bars, the connector 45 is inserted approximately one-half its length into each of the two aligned, tube-like formations of the ends of the conductor bars to be joined and the screws 46, 47 are turned by a screw driver inserted through the openings 20, so that they engage the wall 19 and cause the connector 45 to be tightly pressed against wall portions 24, 25. The non-circular cross section of the connector and the tubular formation into which it is received maintain the channel-shaped contact surfaces in proper angular alignment. This connection may be made with the sheathing 16 removed from the conductor bars so that access may be had to the screws 46, 47 through the opening 20 or small openings may be made in the sheathing through which the screw driver can be inserted.

In connecting two conductor bars, the adjoining insulating sheathings are preferably overlapped as seen in Fig. 3 to insure insulation of the conductor bars at the joint. For this purpose, it is preferable to furnish each conductor bar with a sheathing which is flush with one end but extends beyond the opposite end a small amount, for example approximately ⅜". The flanges 28 of the excess sheathing is preferably removed, as seen in Fig. 3A. When two conductor bars are connected in the installation of the carrier system, the sheathing extending beyond the end of one bar is telescoped over the flush ends of the other conductor bar and its sheathing. The flanges 28 of the overlapping sheathing abut the flanges of the under sheathing to substantially completely cover the lower edges of the abutting conductor bars. It will be noted that the relatively thin, resilient walls of the sheathing particularly adapt the sheathing for overlapping as described.

Should a conductor bar be severed to provide a shortened conductor bar section, the insulating sheath may be severed also but to provide a slight excess for overlapping, as described in the preceding paragraph.

A current collector or contact shoe 48 is adapted to be supported by the carrier A in such manner that the top and sides thereof resiliently contact the respective walls of the channel formation of the conductor bar 15. The contact shoe is formed of suitable electrical conducting material, such as copper or carbon, and is generally rectangular, having tapered ends as seen in Figs. 3 and 4. The width of the shoes is approximately 90% of the width of the channel and the shoe is centrally supported on a rod 49 which is rotatably journalled in a tubular insulator 50. The upper end of rod 49 is split and flattened and it is received in an opening through the contact shoe corresponding to the cross section of the flattened portion of the rod. The rod is frictionally secured in the opening through the shoe by a screw 51 threaded in a tapped opening through one fork of the split end of the rod and engaging the inside of the other fork for spreading the forks tightly against the insides of the shoe opening. The rod 49 is rotatively urged about its longitudinal axis by a coil spring 52 to resiliently maintain opposite side surfaces of the shoe on either side of the shoe center in contact with the two sides, respectively, of the channel of the conductor bar 15. The coil spring 52 is attached at one end to the insulator 50 and its other end is turned and engages in a vertical slot in a collar 53 keyed to the rod 49 by a pin 54. Preferably, the spring 52 is covered by an insulating cap 54' resting on the collar 53. It is important that the contact shoe be inserted into the conductor channel in such angular position that the spring 52 urges the shoe against the sides of the channel as described. To prevent improper positioning of the shoe, one end of pin 54 projects from collar 53 and is adapted to abut opposite ends of an arcuate stop member 55 attached to the insulator 50. The stop member 55 limits possible rotation of the shoe to about 180° and it is positioned to allow the shoe to move approximately 30° counterclockwise, as viewed in Fig. 7, from its normal conductor engaging position. It will be seen that although the shoe can rotate to a certain extend relative to the conductor 50, the shoe can only be inserted into the conductor channel in a position to be acted upon by spring 53.

The insulator 50 is carried by two parallel links 57, 58 which are bifurcated at the ends and which are pivotally attached at one end to a lug 56 formed on the insulator 50 and at the other end to a bracket member 59 supported on a rod 60, which is pivoted in an arm 61 forming a part of the carrier A. By pivoting the member 59, as shown, the shoe 48 is maintained in contact with the conductor B although the carrier may move laterally of the rail. A rod 63 is pivotally connected to the link 57 by a pin 64 and the lower end of the rod extends between the tines of the link 58 at one end and through a guide opening through the member 59. A compression spring 65 is provided on the rod 63 and reacts between member 59 and the upper end of the rod 63 to raise the insulator 50 vertically and resiliently maintain the top surface of the shoe 48 in engagement with the inner wall 19 of the channel formation of the conductor bar 15. The parallel arrangement of the links 57, 58 causes the insulator 50 to be urged in an axial direction normal to the conductor bars 15 to maintain the entire top surface in contact with the conductor bar. The lug 56 has stop formations 66 which are adapted to engage link 57 when the insulator 50 is raised a predetermined distance to limit upward movement of the insulator.

Preferably, the centers of the pivotal connections between the links 57, 58 and the member 59 are in planes above the levels of the centers of the pivotal connections between the links and the insulator 50, as indicated at X. This arrangement causes the ends of the links 57, 58 pivoted to the carrier to travel in a plane lying intermediate the conductor and the plane of travel of the opposite ends of the links and in the event the shoe 48 tends to stick to the conductor the links will tend to knuckle the insulator 50 downwardly or away from the conductor and release the shoe, regardless of the direction of travel of the carrier. Otherwise, should the shoe tend to stick in the conductor while the carrier was moving in a direction in which the shoe leads the links, the links would tend to wedge the shoe tightly into the conductor channel and damage the apparatus.

The lower end of the rod 49 has a lead wire 67 connected thereto by a terminal screw 68 for connecting the shoe 48 with the motor circuit and, preferably, the lower end of the insulator 50 is recessed as at 69 to shield the terminal connection of the rod and lead wire.

From the foregoing description of the preferred form of the invention, it will be apparent that the invention provides a conductor bar which may be economically manufactured and readily assembled in a carrier system with a minimum of labor and parts. The assembly of the conductor is facilitated by the provision of the tubular formation longitudinally of the conductor bar and the manner in which abutting ends of the bars may be attached to one another by the connector members. The contact surfaces of the conductor bar are concealed, and the exposed surfaces are particularly suitable for the application of an insulating sheathing thereover. The form of the contact surface of the conductor bar and the manner in which the contact shoe is supported in engagement therewith provides an exceptionally good electrical connection between the conductor bar and the shoe, which connection is maintained although the position of certain portions of the conductor may vary somewhat in its relation to the monorail.

While the preferred embodiment of the invention has been described in considerable detail, it will be apparent that the invention is not limited to the construction shown, and it is our intention to cover hereby all adaptations, modifications, and changes therein which come within the practice of those skilled in the art to which the invention relates.

Having thus described the invention, we claim:

1. In an electrical distribution system, a rail type conductor having a longitudinally extending channel formation, a contact shoe having the length thereof greater than the width of said channel formation, means for supporting said shoe in said channel formation and for rotation about an axis lying in a plane normal to a line extending lengthwise of said conductor and intermediate the ends of said shoe, and means yieldably urging said shoe about said axis for maintaining opposite sides of opposite end portions of said shoe in electrical contact with opposite sides of said channel formation, said channel formation being of sufficient width to allow limited rotation of said shoe therein.

2. In an electrical distribution system, a rail type conductor having a longitudinally extending channel formation, a contact shoe having the length thereof greater than the width of said channel formation, means for supporting said shoe in said channel formation and for rotation about an axis lying in a plane normal to a line extending lengthwise of said conductor and intermediate the ends of said shoe, and means yieldably urging said shoe about said axis for maintaining opposite end portions of said shoe in electrical contact with opposite sides of said channel formation and for yieldably urging said shoe against the inner wall of the channel formation, said channel formation being of sufficient width to allow limited rotation of said shoe therein.

3. In an electrical distribution system, a rail type conductor having a longitudinally extending channel formation, a contact shoe having the length thereof greater than the width of said channel formation, means for supporting said shoe for rotation about an axis lying in a plane normal to a line extending lengthwise of said conductor and intermediate the ends of said shoe, means yieldingly urging said first-mentioned means toward said channel formation, and means yieldably urging said shoe about said axis for maintaining opposite end portions of said shoe in electrical contact with opposite sides of said channel formation, said channel formation being of sufficient width to allow limited rotation of said shoe therein.

4. In an electrical distribution system, a rail type conductor having a longitudinally extending channel formation having planar side and bottom contact surfaces, a contact shoe having the length thereof greater than the width of said channel formation, a member supporting said shoe in said channel formation, said member being rotatable about an axis lying in a plane normal to a line extending lengthwise of said conductor and intermediate the ends of said shoe, means yieldably urging said member about said axis for maintaining opposite end portions of said shoe in electrical contact with opposite sides of said channel formation, said channel formation being of sufficient width to allow disengagement of said opposite ends from the opposite sides of said channel formation, and means for yieldingly urging said member axially toward the inner wall of said channel.

5. In an electrical distribution system, an overhead rail type conductor having a longitudinally extending, inverted channel formation having planar side and bottom contact surfaces, a contact shoe having the length thereof greater than the width of said channel formation, a member for supporting said shoe in said channel formation, said member being rotatable about an axis lying in a plane normal to a line extending lengthwise of said conductor and intermediate the ends of said shoe, and means yieldably urging said member upwardly along a line perpendicular to said bottom contact surface and about said axis for maintaining the top surface of the shoe against the inner wall of the channel formation and opposite end portions of said shoe in electrical contact with opposite sides of said channel formation.

6. In an electrical distribution system, two rail type conductors arranged in end-to-end relation, the adjacent end portions of said conductors each having aligned longitudinally extending apertures, said conductors each having a channel formation provided with opposed side surfaces aligned with the channel formation of the other conductor, a rod extending from the interior of one aperture into the other aperture, friction means for securing said rod into tight frictional engagement with the walls of said apertures, a contact shoe having the length thereof greater than the width of said channel formation, means for supporting said shoe in said channel formation and for rotation about an axis lying in a plane normal to a line extending lengthwise of said conductors and intermediate the ends of said shoe, and means yieldably urging said shoe about said axis for maintaining a surface of said shoe in electrical contact with a side of said channel formation, said channel formation being of sufficient width to allow limited rotation of said shoe.

7. In an electrical distribution system, two rail type conductors arranged in end-to-end relation, the adjacent end portions of said conductors each having aligned longitudinally extending apertures, said apertures each being non-circular in cross section, said conductors each having a channel formation provided with parallel opposed surfaces aligned with the channel formation of the other conductor, a rod extending from the interior of one aperture into the other aperture, friction means for securing said rod into tight frictional engagement with the walls of said apertures, a contact shoe having the length thereof greater than the width of said channel formation, means for supporting said shoe in said channel formation and for rotation about an axis lying in a plane normal to a line extending lengthwise of said conductors and intermediate the ends of said shoe, and means yieldably urging said shoe about said axis for maintaining opposite end portions of said shoe in electrical contact with opposite sides of said channel formation, said channel formation being of sufficient width to allow limited rotation of said shoe.

8. In an electrical distribution system, two rail type conductors arranged in end-to-end relation, the adjacent end portions of said conductors each having aligned longitudinally extending apertures, said apertures each being non-circular in cross section and having a slot-like opening in one side, said conductors each having a channel formation providing parallel opposed contact surfaces aligned with the channel formation of the other conductor, a rod extending from the interior of one aperture into the other aperture, clamping means on said rod for engaging one wall of said aperture and forcing said rod into tight frictional engagement with the wall of said aperture opposite said one wall thereof, said means being accessible through said slot-like openings, a contact shoe having the length thereof greater than the width of said channel formation, means for supporting said shoe in said channel formation and for rotation about an axis lying in a plane normal to a line extending lengthwise of said conductors and intermediate the ends of said shoe, and means yieldably urging said shoe about said axis for maintaining opposite end portions of said shoe in electrical contact with opposite sides of said channel formation, said channel formation being of sufficient width to allow limited rotation of said shoe.

9. A current collector for a trolley type electrical distribution system, said collector comprising, an elongated contact shoe, means supporting said shoe for rotation about an axis lying in a plane normal to a line extending lengthwise of said shoe and intermediate the ends of said shoe, and means resiliently urging said shoe in one direction about said axis, said shoe having contact surfaces on opposite sides of said axis.

10. A current collector for a trolley type electrical distribution system, said collector comprising, an elongated contact shoe, means supporting said shoe for rotation about an axis normal to a line extending lengthwise of said shoe and at the central portion of said shoe, said shoe having contact surfaces on opposite sides of said axis, and means resiliently urging said shoe in one direction about said axis.

11. A current collector for a trolley type electrical distribution system, said collector comprising, an elongated contact shoe having a contact surface on a side thereof and a contact surface substantially normal to said side surface, means supporting said shoe for rotation about an axis normal to and intermediate the ends of said shoe, said shoe having contact surfaces on opposite sides of said axis, means resiliently urging said shoe about said axis in one direction, and means resiliently urging said shoe in a direction longitudinally of said axis.

12. A current collector for a trolley type electrical distribution system, said collector comprising an elongated contact shoe, means supporting said shoe for rotation about an axis normal to a line extending lengthwise of said shoe, said shoe having contact surfaces on opposite sides of said axis, means resiliently urging said shoe about said axis in one direction, and means resiliently biasing said shoe in a direction longitudinally of said axis.

13. A current collector for a trolley type electrical distribution system, said collector comprising, an elongated contact shoe having contact surfaces on opposite sides thereof spaced longitudinally of the shoe and a contact surface at the top thereof, a rod fixedly connected to said shoe intermediate the first said contact surfaces and extending from the bottom surface of said shoe, means resiliently tending to rotate said rod in one direction, and means resiliently biasing said rod longitudinally in the direction of said top surface.

14. A current collector for connecting a carrier to a conductor supported along the path of movement of the carrier comprising a contact shoe having a carrying structure extending transversely of the conductor, said shoe being adapted to frictionally engage the conductor, means for supporting said shoe in contact with the conductor, said means including a link interconnecting the carrier and said shoe carrying structure, said link extending generally in the direction of travel of the carrier and being pivoted to the carrier to swing said structure toward and from the conductor, and the pivot between said link and said carrier being maintained intermediate the plane of the conductor bar transverse to said structure and a plane parallel to the first mentioned plane and extending through the connection of the link with said shoe support structure.

15. A current collector for connecting a carrier to a conductor supported along the path of movement of the carrier comprising a contact shoe having a carrying structure and adapted to frictionally engage the conductor, said shoe carrying structure extending generally transverse to the length of the conductor, and means connected to said structure for supporting said shoe carrying structure with said shoe in contact with the conductor, said means including parallel links interconnecting the carrier and said shoe carrying structure, said links extending generally in the direction of travel of the carrier and being pivoted to the carrier to swing said structure toward and from the conductor, the pivots of the respective links to the carrier being maintained intermediate the conductor and the connections of the links with said shoe support structure.

16. A current collector assembly for electrically connecting a carrier to a conductor bar supported along the path of movement of the carrier, comprising a collector member adapted to frictionally engage and move along a surface of the conductor bar; a carrying structure for supporting said member extending generally transverse to the length of the conductor bar; means for supporting said carrying structure with said member in engagement with said surface, comprising parallel links interconnecting the carrier and said structure, and connected to said structure and the carrier at spaced points along each link, said links extending generally parallel to the direction of travel of the carrier; first pivot means connecting said links to said carrier to swing said structure toward and away from said conductor bar; and second pivot means connecting said links to said structure; said first pivot means being located closer to a plane through said member and transverse to said structure than the second pivot means.

17. In an electrical distribution system, a rail type conductor having two adjacent contact surfaces one extending substantially at right angles to the other, an elongated contact shoe having two adjacent longitudinally extending surfaces one extending substantially at right angles to the other, supporting means for said shoe comprising means continually biasing said shoe in a direction to urge one of said surfaces of said shoe against one contact surface of said conductor, and means continually biasing said shoe in a second direction to urge the other of said surfaces thereof into engagement with the other of said contact surfaces of said conductors.

18. In an electrical distribution system, a rail type conductor having two adjacent contact surfaces one extending substantially at right angles to the other, an elongated contact shoe having two adjacent longitudinally extending surfaces one extending substantially at right angles to the other, supporting means for said shoe comprising a member for carrying said shoe, means continually biasing said shoe in a direction to urge one of said surfaces of said shoe against one contact surface of said conductor, means continually biasing said shoe in a second direction to urge the other of said surfaces thereof into engagement with the other of said contact surfaces of said conductors, one of said biasing means comprising a pantograph for supporting said shoe for movement along a line perpendicular to one of said surfaces, said pantograph having first pivot connections to said carrier and movable pivot connections to said member with the fixed pivots of said pantograph being located closer to said conductor than the movable pivots.

References Cited in the file of this patent

UNITED STATES PATENTS

| Number | Name | Date |
|---|---|---|
| 406,391 | Dibble | July 2, 1889 |
| 410,498 | Daft | Sept. 3, 1889 |
| 509,065 | Woods | Nov. 21, 1893 |
| 520,356 | Siemens | May 22, 1894 |
| 563,254 | Brandenburg | July 7, 1896 |
| 1,918,854 | Mead | July 18, 1933 |
| 2,136,937 | Cooper | Nov. 15, 1938 |
| 2,254,147 | Horn | Aug. 26, 1941 |
| 2,267,207 | Martin | Dec. 23, 1941 |
| 2,358,116 | Wehr | Sept. 12, 1944 |